United States Patent [19]
Ekholm

[11] 4,105,107
[45] Aug. 8, 1978

[54] FEEDING DEVICE FOR GUIDING PIECES OF LUMBER TO THE ONE OR THE OTHER OF TWO LONGITUDINAL CONVEYORS

[75] Inventor: Rolf Ekholm, Nyland, Sweden

[73] Assignee: AB Hammars Mekaniska Verkstad, Nyland, Sweden

[21] Appl. No.: 777,048

[22] Filed: Mar. 14, 1977

[30] Foreign Application Priority Data

Mar. 18, 1976 [SE] Sweden ............................... 7603385

[51] Int. Cl.$^2$ ............................................ B65G 43/08
[52] U.S. Cl. .................................... 198/358; 198/465; 198/469
[58] Field of Search ............... 198/358, 367, 465, 467, 198/468, 469; 214/1 P, 1 PB

[56] References Cited

U.S. PATENT DOCUMENTS

| 2,298,829 | 10/1942 | McCann | 198/358 |
|---|---|---|---|
| 2,886,164 | 5/1959 | Solecki | 198/358 |
| 3,184,034 | 5/1965 | Stuller et al. | 198/469 X |
| 3,279,625 | 10/1966 | McConnell et al. | 198/476 X |
| 3,282,444 | 11/1966 | McConnell | 198/483 X |
| 3,310,080 | 3/1967 | Delcellier | 198/358 X |
| 4,003,462 | 1/1977 | Perrott | 214/1 P X |

Primary Examiner—Evon C. Blunk
Assistant Examiner—James L. Rowland
Attorney, Agent, or Firm—Strauch, Nolan, Neale, Nies & Kurz

[57] ABSTRACT

A feeding device placed between an infeed conveyor and two longitudinal lumber conveyors for directing pieces of lumber, e.g., logs, fed thereto to one or the other of the two longitudinal conveyors which carry the logs for further processing. The first unit in the feeding device arrangement is a singlepiece feed conveyor, with a photo cell device, which receives a log from the infeed conveyor. The next station is a vertically swingable flap disposed over a gap which can be bridged by the flap. Under the gap is a stepwise drivable winged wheel or set of wheels which is offset adjacent and above one of the longitudinal conveyors which also has an associated photo cell device. Next in the device and located adjacent the base of the flap is a stepwise drivable transverse conveyor which receives logs passing over the flap and has its discharge adjacent and above the second longitudinal conveyor which also has an associated photo cell device. The swingable flap is operated and controlled by automatic equipment, in which the photo cell devices associated with the single piece feed conveyor and the longitudinal conveyors control the position of the flap depending on which longitudinal conveyor is free to receive a log or piece of lumber from the winged wheel or and the transverse conveyor, respectively.

5 Claims, 4 Drawing Figures

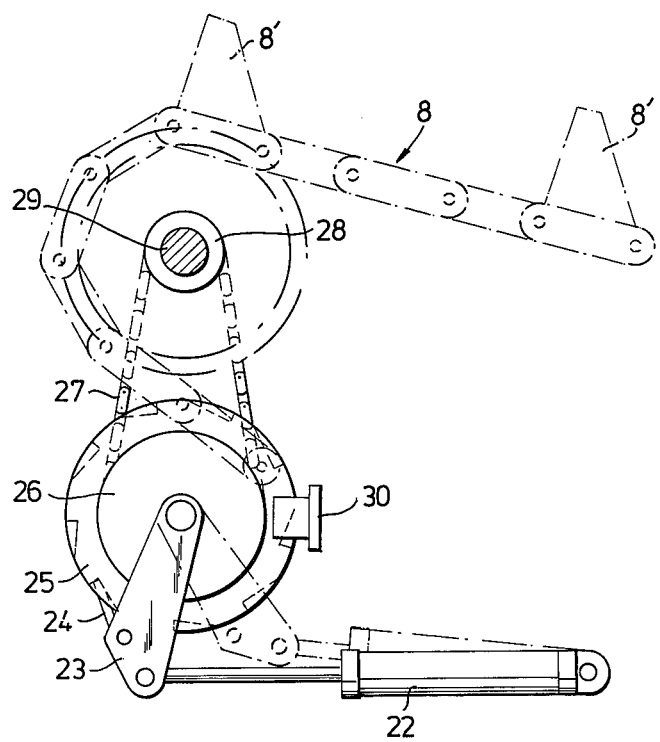

FEEDING DEVICE FOR GUIDING PIECES OF LUMBER TO THE ONE OR THE OTHER OF TWO LONGITUDINAL CONVEYORS

BACKGROUND OF THE INVENTION

The present invention relates to a feeding device for guiding pieces of lumber fed thereto to the one or the other of two longitudinal conveyors, each of which preferably being connected to a barking station.

To make it possible to provide the processing, such as barking, in a lumber processing plant without decreasing the speed of the lumber feeding conveyor of the plant, for example two conveyors can be used to receive the pieces of lumber from the lumber feeding conveyor and to convey the pieces of lumber to a barking device each. However, there is a risk that the operation in one of the barking devices takes more time than expected, whereby the conveyor to that barking device will be blocked when the next piece of lumber arrives, so that an operation disturbance may arise.

SUMMARY OF THE INVENTION

It is an object of the present invention to provide a feeding device, which, at the same speed as the pieces of lumber arriving at the feeding device, can guide the pieces of lumber to the one or the other of two longitudinal conveyors, depending on which longitudinal conveyor that is free to receive a piece of lumber.

The invention relates to a feeding device for guiding pieces of lumber fed thereto to the one or the other of two longitudinal conveyors, each of which preferably being connected to a barking device. According to the invention the feeding device is characterized by the fact that it comprises from a lumber feeding conveyor in turn a single piece feeding conveyor with a photo cell device, a vertically swingable flap, and firstly a gap under said flap which can be bridged over by said flap, a stepwise drivable winged wheel which is located close to one of the longitudinal conveyors in a way known per se with a photo cell device, and secondly a stepwise drivable transverse conveyor having its one end connected to the base of the flap and its other end connected to the other longitudinal conveyor with a photo cell device, said swingable flap being controlled by an automatic equipment, in which said photo cell devices at the longitudinal conveyors are comprised to control the position of the flap depending on which longitudinal conveyor that is free to receive a piece of lumber from said winged wheel and said transverse conveyor respectively.

The invention is illustrated by an embodiment example shown in the attached drawings of a feeding device intended for feeding pieces of lumber, e.g., logs, to two barking stations.

FIGS. 2 and 3 show different side views of a driving means of the feeding device, in which FIG. 3 is at a greater scale than FIG. 2.

FIG. 4 shows at a greater scale and schematically a further driving means of the feeding device.

Figure 1:
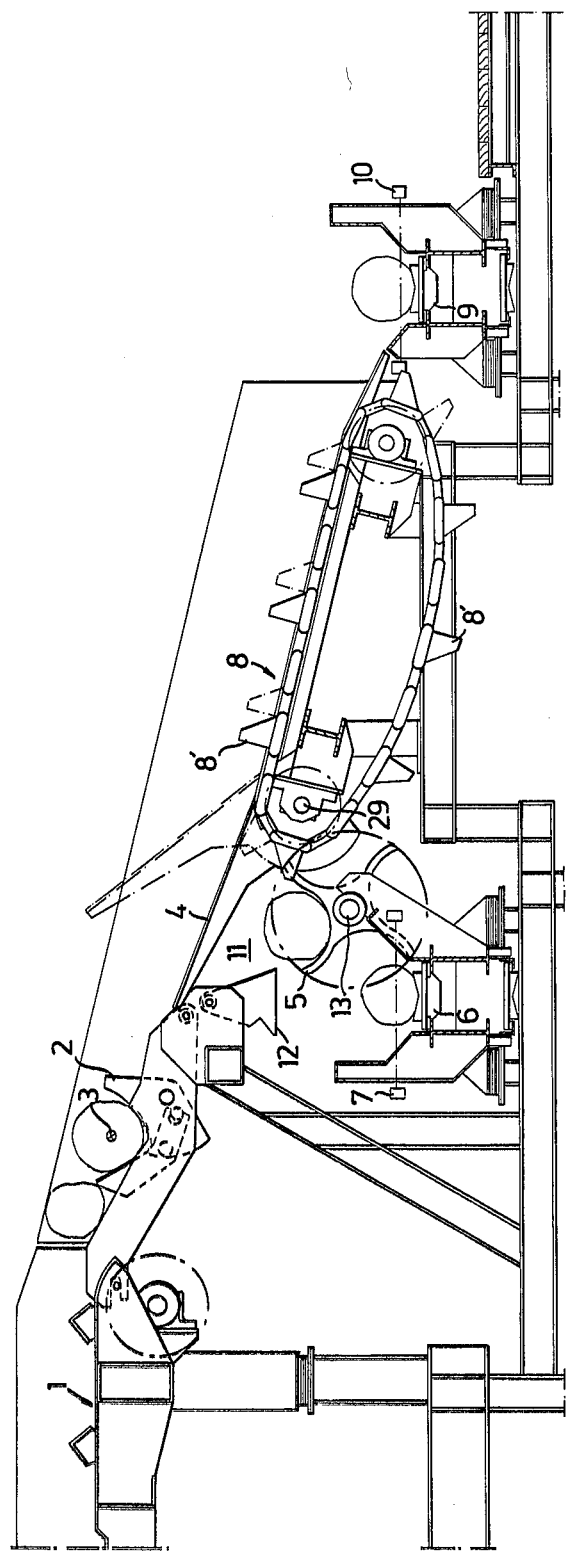
FIG. 1 shows a side view of the feeding device according to the invention.

The feeding device according to the invention as shown in FIG. 1 comprises after a lumber feeding conveyor 1 in turn a single piece feeding conveyor 2 for example of the type described in the U.S. Ser. No. 588,728, now U.S. Pat. No. 3,999,684, a photo cell device 3 being provided at said conveyor 2, a vertically swingable flap 4 over a gap 11, at one side of which a supporting plate 12 is arranged, a winged wheel 5 or a feeding means located under said flap 4 and the gap 11 close to a longitudinal conveyor 6 connected to a barking device not shown and provided with a photo cell device 7, and a transverse conveyor 8, the one end of which being connected to the base of the flap 4 and the other end of which being connected to a longitudinal conveyor 9. A photo cell device 10 is located at the longitudinal conveyor 9. The locations of all the photo cell devices 3, 7, 10 are only shown schematically, and said devices may be located in any other suitable positions.

The flap 4 is swung to its high and low positions over the gap 11 by automatic equipment, in which relays, time relays and the like and the photo cell devices 7, 10 are included in a way known per se.

Figure 2:
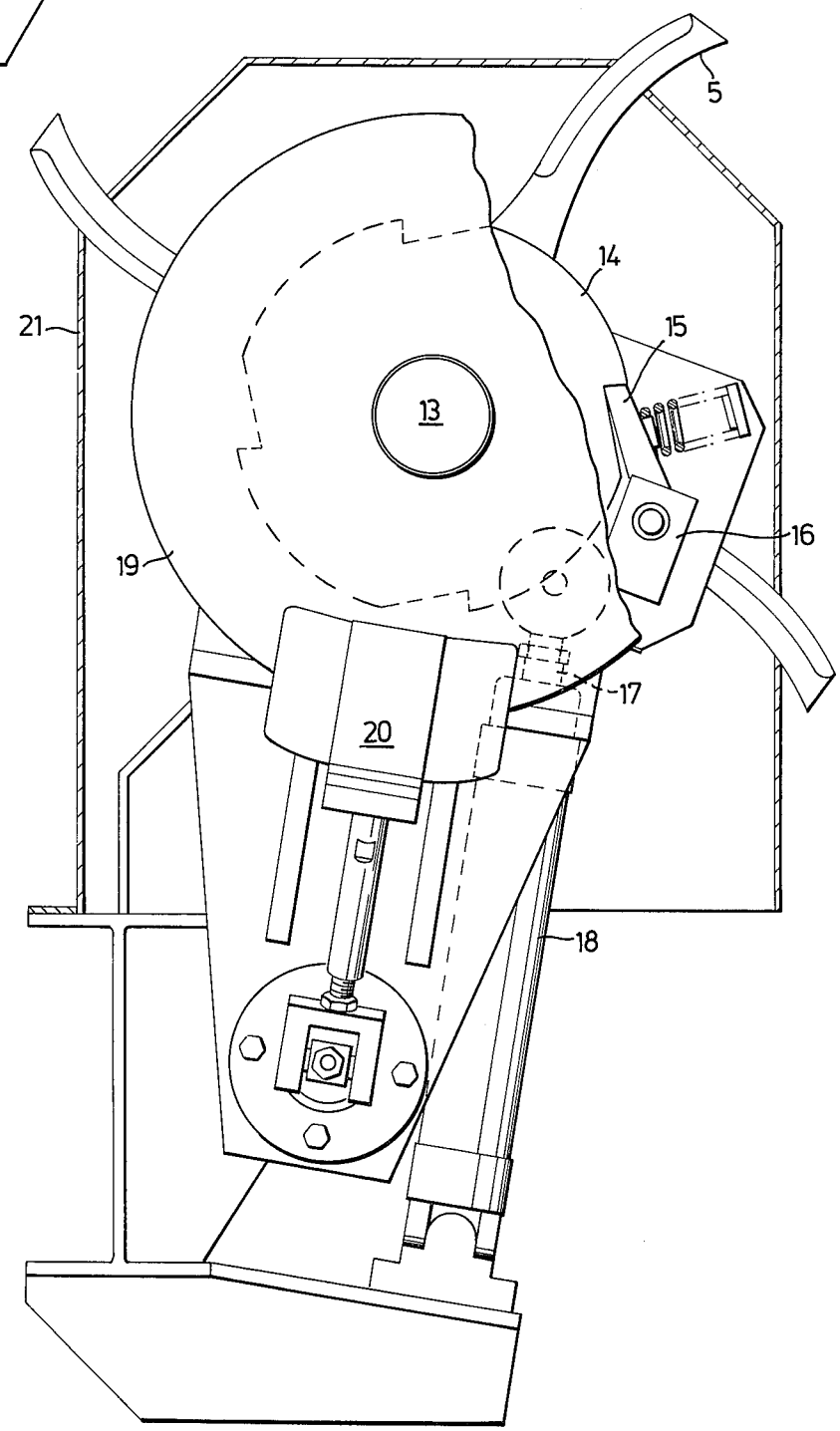
Figure 3:
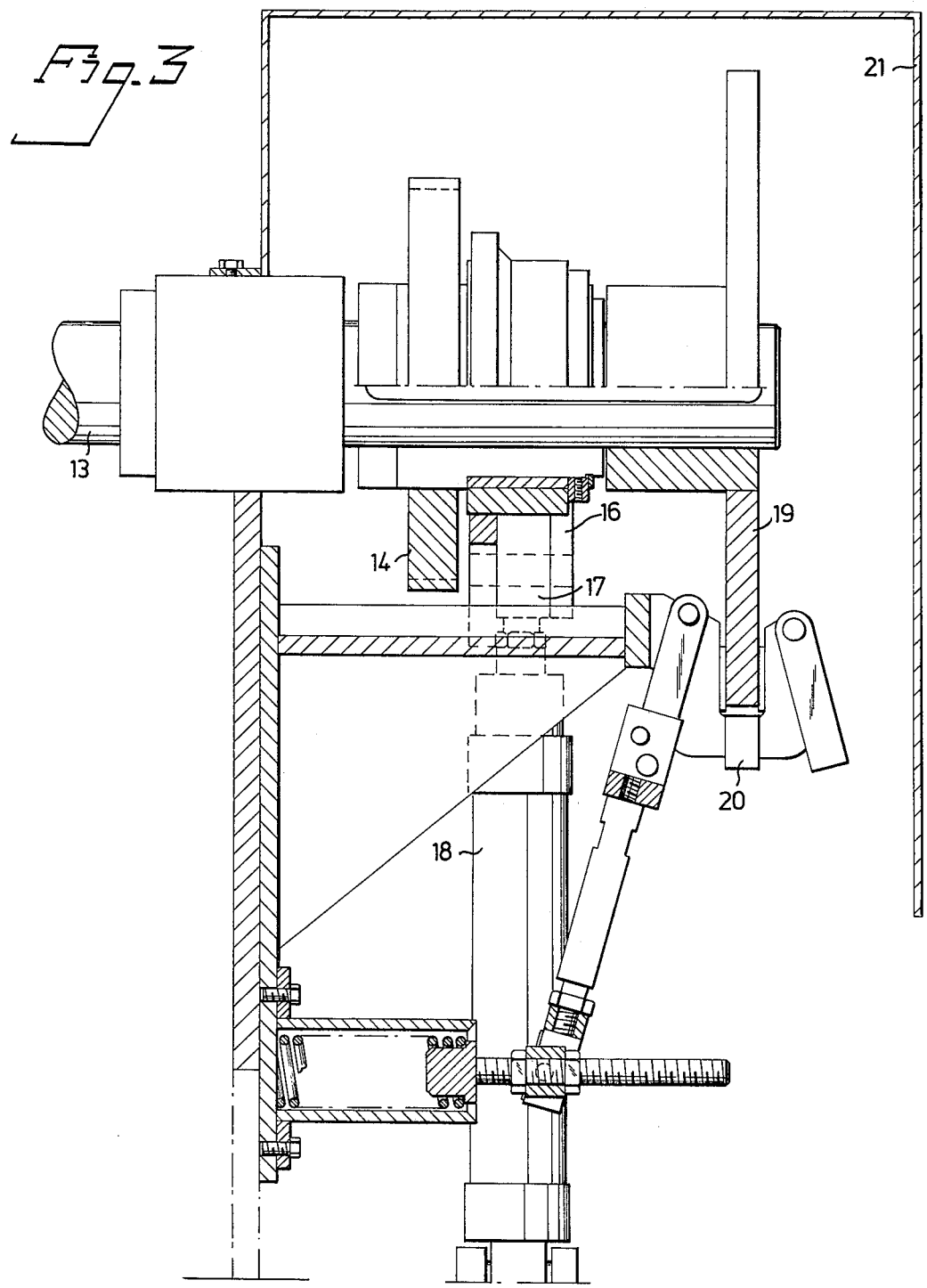

The means for stepwise driving of the winged wheel 5, which means are excluded from FIG. 1, but shown in FIGS. 2 and 3, comprise the following substantial parts. A shaft 13 shown in the lastmentioned figures carries the winged wheel 5 or in fact a number of winged wheels, for example eight, to support a long piece of lumber. A ratchet wheel 14 is arranged on the shaft 13, into which ratchet wheel a latch 15 can engage. Said latch 15 is supported by a latch atttachment 16 rotably mounted on the shaft 13. A piston 17 in a hydraulic cylinder 18 is connected to said latch attachment 16, so that the piston 17 can move the ratchet wheel 14 via the attachment 16 and the latch 15 and thereby the winged wheel 5 stepwise. A brake disc 19 is also fastened on the shaft 13, on which disc an adjustable brake shoe 20 works to retain the brake disc 19 and the shaft 13 in the received position, the latch 15 being drawn back at the same time to make a new feeding forwards thereafter. A protective housing 21 surrounds the divice.

The transverse conveyor 8 is suitably driven by the driving means shown in FIG. 4, but excluded from FIG. 1, said means including a hydraulic piston-cylinder device 22 connected to a lever 23 having a driving latch 24 in engagement with a ratchet wheel 25. Said ratchet wheel 25 is connected to a chain wheel 26, that is in driving connection with a chain wheel 28 by a chain 27, said chain wheel 28 being arranged on a shaft 29 in the transverse conveyor 8. A disc brake 30 works on the ratchet 25 to retain it when the driving latch 24 is drawn back. By each stroke of the piston-cylinder device 22 the transverse conveyor 8 is driven one step, i.e. the distance between the lumber supporting surfaces of the dogs 8' of the transverse conveyor. The hydraulic means of the winged wheel 5 and the transverse conveyor 8 start to work in a determined succession or independent of each other in the one or the other case.

The conveyors 1, 8, the single piece conveyor 2, the flap 4 and the winged wheel 5 are of course wide enough to let a piece of lumber rest with its whole length on said parts.

The described device has the following function. Pieces of lumber are fed fowards on the feeding conveyor 1. It is provided that the barking devices connected to the longitudinal conveyors 6, 9 together can bark the pieces of lumber at the same rate that the conveyor 1 feeds the lumber. Said conveyor 1 leaves the pieces of lumber to the single piece conveyor 2, the photo cell device of which reading this, whereafter the single piece conveyor 2 feeds the piece of lumber further on. The piece of lumber passes over the flap 4, which is turned down, and continues to the transverse conveyor 8 and against the adjacent dogs 8' thereof, said dogs 8' being moved forward one step together with the piece of lumber. When the next piece of lumber is fed down from the single piece conveyor 2 the flap 4 is turned up under control of the automatic equipment, and the piece of lumber will fall down through the gap 11 on to the winged wheel 5, which feeds the piece of lumber to the longitudinal conveyor 6 for further feeding to the barking device. Meanwhile the supporting plate 12 has prevented the piece of lumber from falling off from the winged wheel 5. During the normal run every other piece of lumber is transmitted to the longitudinal conveyor 6 and its barking device and every other piece of lumber is transmitted to the longitudinal conveyor 9 and its barking device by the flap 4.

However, the pieces of lumber are not equally long and thick, so the barking of a certain piece may take longer time than that of the other pieces. If, because of this, a piece of lumber on the longitudinal conveyor 6 or 9 is delayed, this will be registered by the respective photo cell 7 or 10 and the flap will take such a position, that the next piece of lumber will be moved to that conveyor 6 or 9, which is free. If for example the longitudinal conveyor 6 is occupied, the flap 4 will take its turned down position to transmit the next piece of lumber to the transverse conveyor 8, and the flap 4 will stay in this position as long as the longitudinal conveyor 6 is occupied.

Accordingly, the device according to the invention has the advantage that the pieces of lumber are transmitted to barking devices in dependence of the time length of the last barking operation of the one or the other barking device, whereby the operation can continue without interruptions.

The invention is not restricted to the embodiment described above and shown in the drawings, since it can be varied within the scope of the invention. For example the winged wheel 5 can have another number of wings or lumber retaining recesses, for example 5 or 6, the transverse conveyor 8 can have another length and another number of dogs than what is shown in the drawings. Also the shapes of the details of the device can be modified.

What we claim is:

1. A feeding apparatus for receiving lumber from the output end of a conveyor which feeds lumber in lateral arrangement and for guiding and directing pieces of lumber fed thereto to one or the other of two longitudinal conveyors, each of which can longitudinally convey the pieces to further processing devices, characterized in that said feeding apparatus comprises: in sequence, a single piece conveyor with an associated photo cell device, a stepwise drivable winged wheel conveyor disposed immediately below the outfeed end of the single piece conveyor adapted to be located closely adjacent and offset above a first one of the longitudinal conveyors; a second photo cell device associated with the first of the longitudinal conveyors; a stepwise drivable transverse conveyor having its infeed end disposed lower than, aligned with, spaced apart from and downstream of the single piece conveyor and with its other end disposed above the other longitudinal conveyor; a third photo cell device associated with the other longitudinal conveyor; a flap having a downstream edge hinged on a horizontal axis adjacent, parallel to and aligned with the infeed end of said transverse conveyor and swingable about its axis from a bridging position between the outfeed end of said single piece conveyor and the infeed end of said transverse conveyor to a raised position creating a gap between the spaced apart single piece conveyor and the transverse conveyor; power means to raise and lower said swingable flap; power means to operate said single piece conveyor; power means to provide stepwise operation of said transverse conveyor; power means to operate said winged wheel conveyor in stepwise operation; said photo cell devices being situated adjacent their associated conveyors to detect whether or not pieces of lumber are positioned on the associated conveyor whereby automatic equipment can be used to receive condition signals from said photo cells to control the power means for the conveyors of said apparatus and to control the position of the flap depending on which longitudinal conveyor is free to receive a piece of lumber from said winged wheel conveyor and said transverse conveyor, respectively.

2. A feeding apparatus as defined in claim 1, wherein said winged wheel conveyor has an axle with a plural number of wings extending radially from its axle providing plural equiangularly spaced apart pockets to receive a piece of lumber falling off the outfeed end of the single piece conveyor, and said power means for said winged wheel conveyor includes a ratchet drive connected to said axle and a reciprocable ratchet connected to a reciprocable hydraulic motor, and each reciprocation of said ratchet rotates the winged wheel conveyor a distance equal to the spacing between said pockets.

3. A feeding apparatus as defined in claim 2, wherein a braking device is connected to the axle of said winged wheel conveyor and said braking device is adapted to be operable in coordination with said ratchet reciprocation to brake said winged wheel conveyor wherever it is not being stepped.

4. A feeding apparatus as defined in claim 1, wherein said transverse conveyor is a chain and dog conveyor with a chain drive axle shaft at one end, and spaced apart dogs on the conveyor chains to receive a piece of lumber passing over the flap from the outfeed end of the single piece conveyor, and said power means for said transverse conveyor includes a ratchet drive connected to said axle shaft and a reciprocable ratchet connected to a reciprocable hydraulic motor, and each reciprocation of said ratchet rotates the transverse conveyor axle shaft a distance equal to the spacing between said spaced apart dogs.

5. A feeding apparatus as defined in claim 4, wherein a braking device is connected to the chain drive axle shaft of said transverse conveyor and said braking device is adapted to be operable in coordination with said ratchet reciprocation to brake said transverse conveyor wherever it is not being stepped.

* * * * *